Feb. 8, 1927.
H. A. HILTON
EGG TURNING RACK
Filed Dec. 18, 1925
1,616,972
2 Sheets-Sheet 1
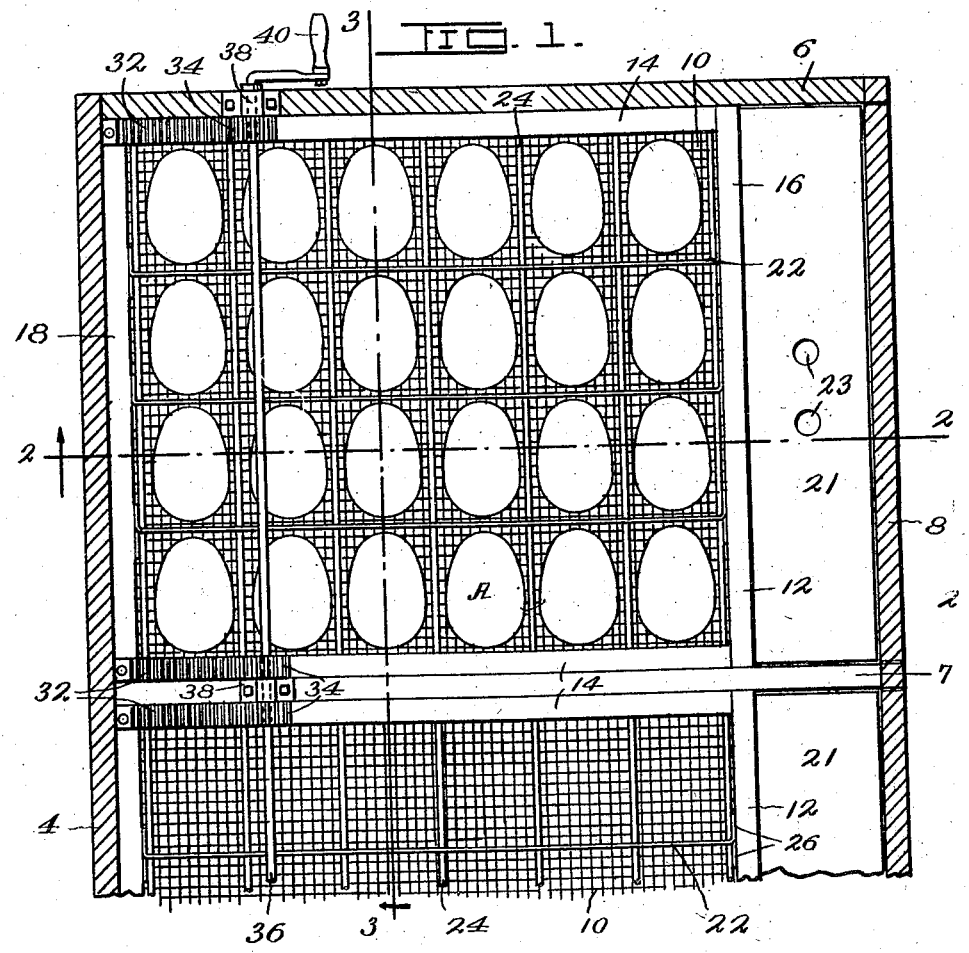
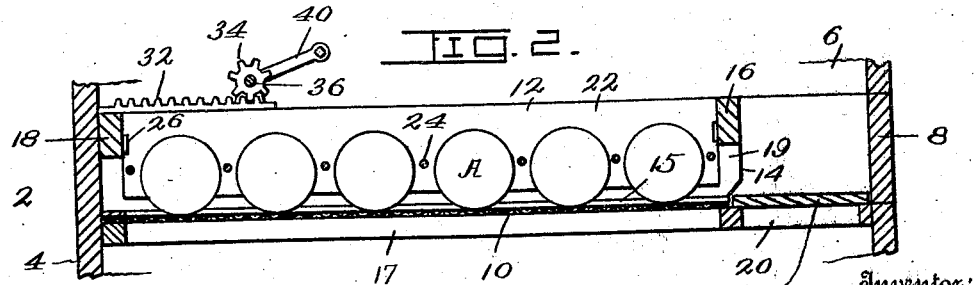
Inventor:
Harry A. Hilton,
By
F. G. Fischer,
Attorney.
Witness:
Fred C. Fischer.

Feb. 8, 1927. 1,616,972
H. A. HILTON
EGG TURNING RACK
Filed Dec. 18, 1925    2 Sheets-Sheet 2
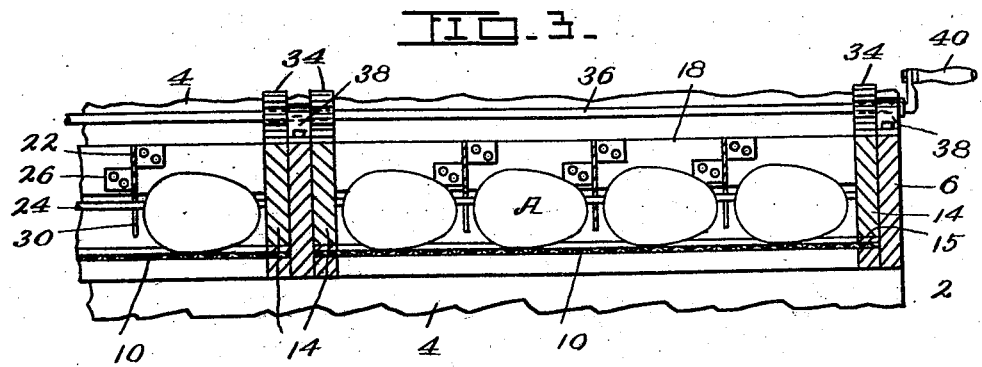
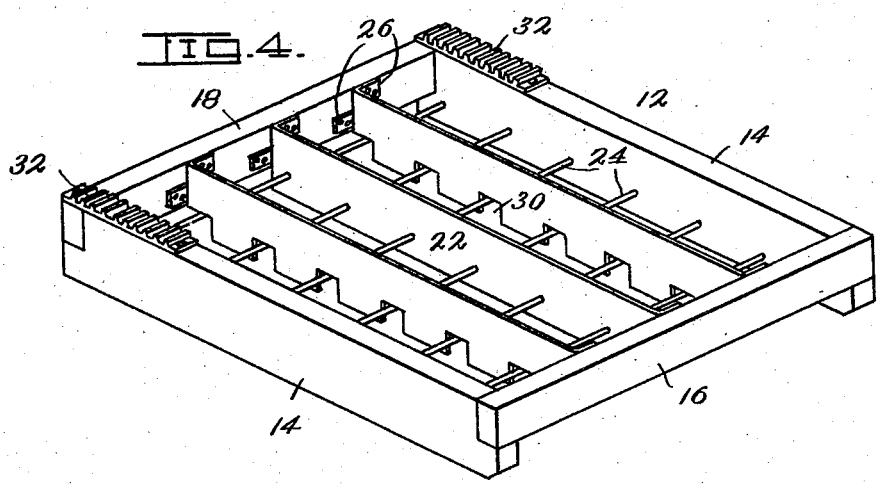
Inventor:
Harry A. Hilton,
By
F. G. Fischer,
Attorney.
Witness:
Fred C. Fischer.

Patented Feb. 8, 1927.

1,616,972

UNITED STATES PATENT OFFICE.

HARRY A. HILTON, OF BOSTON, MASSACHUSETTS.

EGG-TURNING RACK.

Application filed December 18, 1925. Serial No. 76,250.

My invention relates to devices for turning eggs in incubators, and my object is to provide a highly efficient device of this character which can be manufactured at a minimum cost, is compact in form and whereby a number of eggs may be simultaneously and accurately turned, thereby saving the time and labor involved when each individual egg is turned by hand.

In order that the invention may be fully understood, reference will now be had to the accompanying drawings, in which:

Fig. 1 is a broken horizontal sectional view of an incubator equipped with my egg turning device.

Fig. 2 is a broken section on line 2—2 of Fig. 1.

Fig. 3 is a broken section on line 3—3 of Fig. 1.

Fig. 4 is a detail perspective view of one of the egg turning racks constituting an important feature of the invention.

Referring now in detail to the different parts, 2 designates the incubator which may be of any suitable form and size and embodies a rear wall 4, side walls 6, one or more partition walls 7, and front doors 8 through which latter access is had to the interior of the incubator for placement or removal of the eggs A. The incubator is provided with a wire netting tray 10 for supporting the eggs which are held in spaced relation to each other by egg turning devices or racks 12.

As shown more clearly by Fig. 4, each rack 12 consists of a pair of side bars 14, a front bar 16 and a rear bar 18. The front bar 16 extends to only half the depth of the side bars 14 to leave an opening 19 through which the chicks, after being hatched, may pass to an opening 20 and thence down into the brooder, not shown.

The side bars 14 are slidably mounted upon rails 15, which hold the side margins of the tray 10 upon cleats 17 secured to the adjacent walls of the incubator. As shown more clearly by Fig. 2, the openings 20 are arranged between the forward portions of the trays 10 and the adjacent doors 8 are normally closed by lids 21, Figs. 1 and 2, which support the front rows of eggs A when the racks 12 are moved forward from the position shown by Fig. 2. The lids 21 have finger holes 23, so that they can be easily handled.

Each rack 12 is divided into individual egg compartments of uniform size by longitudinal partitions 22 and transversely disposed rollers 24. The partitions 22 are preferably made of tin or other sheet metal and each has its ends bent in opposite directions as indicated at 26 and tacked or otherwise secured to the front bar 16 and the rear bar 18 of the rack. The rollers 24 are journaled in the side bars 14 and also in the centrally disposed partition 22, the remainder of the partitions being notched or cut away as indicated at 30 to avoid frictional contact with the rollers 24.

When more than one rack is employed in the incubator as shown by Figs. 1 and 3, each rack is provided at the upper rear portions of its side bars 14 with toothed rack bars 32, which are engaged by cog wheels 34 fixed upon a shaft 36 journaled in bearings 38 and provided at one end with a crank 40 whereby said shaft may be rotated. By thus actuating the racks it is not necessary to open the front doors 8 when the eggs are to be turned, and hence the temperature within the incubator is not affected as would be the case if cold air were permitted to enter through the doors 8.

It is the usual practice to turn the eggs over three or more times each twenty-four hours during the process of incubation. When the operation of turning the eggs is accomplished by hand it is never certain just how much the eggs are turned and a great many will be turned too far so that the same sides will again be turned down. By the use of my egg turning mechanism all of the eggs are accurately turned alike by simply moving the racks 12 to a backward position or a forward position. The racks 12 are free to move only just far enough to turn the eggs one-half revolution when moved forward.

On the eighteenth day the racks 12 may be readily removed from the incubator without removing the eggs from the trays 10, or if preferred said racks may be left in the incubator and after the chicks have hatched they may enter the brooder through the openings 19 and 20, as hereinbefore stated.

The egg turning racks 12 may also be used in connection with storage receptacles in which eggs are kept while being accumulated for hatching purposes, as at such times they should be turned over daily.

From the foregoing description it is apparent that I have provided an egg turning rack embodying the advantages above pointed out, and while I have shown and described the preferred construction of said rack I reserve all rights to such changes and modifications thereof as properly fall within the spirit and scope of the invention as claimed.

Having thus described my invention, what I claim and desire to secure by Letters Patent, is:

An egg turning rack consisting of two side bars, front and rear bars uniting said side bars, spaced rollers journaled in said side bars, and spaced partitions secured at their ends to the front and rear bars, one of said partitions acting as a support for the intermediate portions of the rollers and the remainder of the partitions having notched portions to clear said rollers.

In testimony whereof I affix my signature.

HARRY A. HILTON.